April 29, 1952 C. W. McKEE ET AL 2,594,332
MULTIPLE COIL PICKUP
Filed April 25, 1947 3 Sheets-Sheet 1
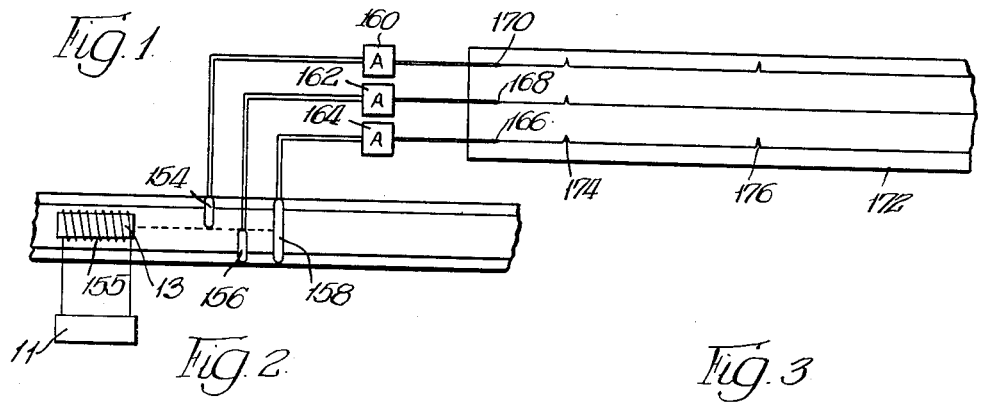
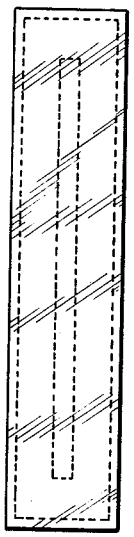
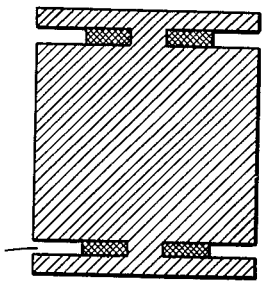
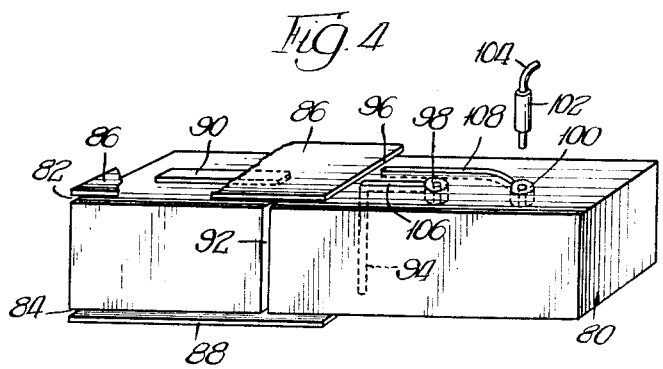
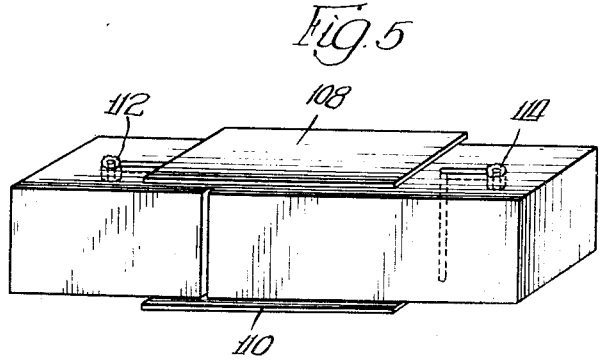
INVENTORS.
Chester W. McKee,
BY Richard W. McKee, April 29, 1952
C. W. McKEE ET AL
2,594,332
MULTIPLE COIL PICKUP
Filed April 25, 1947
3 Sheets-Sheet 3
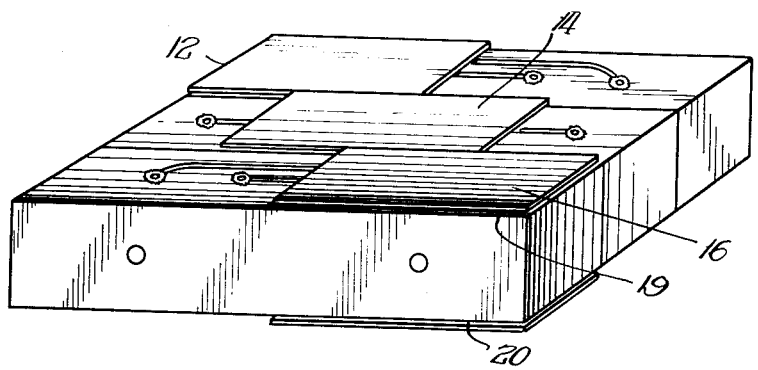
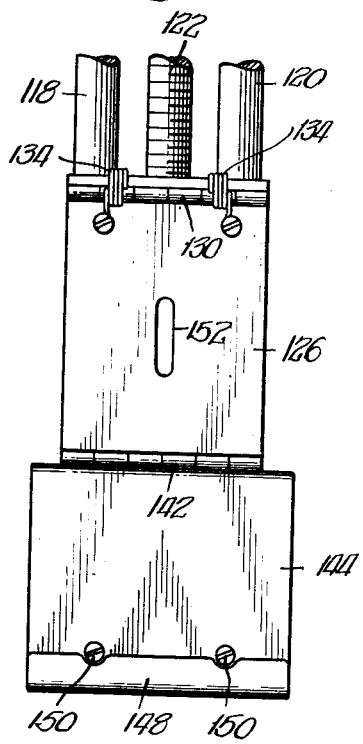
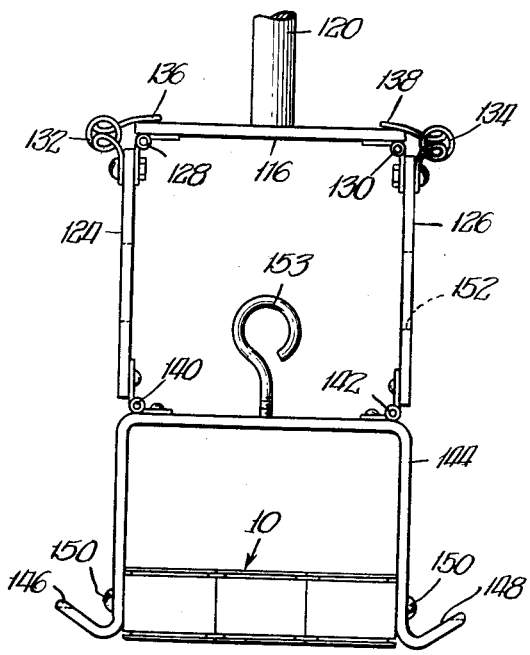
INVENTORS.
Chester W. McKee,
BY Richard W. McKee,
Wilfred S. Stone
ATTY Patented Apr. 29, 1952

2,594,332

UNITED STATES PATENT OFFICE 2,594,332

MULTIPLE COIL PICKUP

Chester W. McKee and Richard W. McKee, Chicago, Ill., assignors, by mesne assignments, to Teledetector, Inc., a corporation of Delaware Application April 25, 1947, Serial No. 743,794

8 Claims. (Cl. 175—183)

This invention relates to rail fissure detector apparatus and more particularly to a multiple coil pickup and wiring arrangement wherein the coils are independently connected to amplifiers and pens so that the method of detecting flaws in rails disclosed in Patent No. 2,388,683, dated November 13, 1945, may be employed. This application is a continuation in part of applicants' copending application, Serial No. 628,146, filed November 13, 1945.

One object of this invention is to improve the system of testing rails by means of a small pickup coil having a nonmagnetic core. Quoting from page 12 of the copending application:

"*Experiment No. 4.*—The problem of segregating burns, shells and flows, however, remained, for a mark on the tape should not be overlooked unless a visible surface defect is seen to account for it. The shells are all on the gauge side of the rail and the flows are on the field side while the burns are usually on the high point of the rail, namely, the center, although this is not always true. In order to assist the helper and the operator, it was decided to add two separate pickups behind the main air coil pick-up and to connect each of these two pick-ups through a separate amplifier to a separate pen, which pen, is operating on the same tape as the pen actuated by the air core coil. This arrangement is not to be confused with the multiple coil pick-ups now in use wherein the pick-ups are hooked in series through a single amplifier to a single pen. Nor, with such a multiple pick-up in combination with a separate rail joint pick-up operating through a separate amplifier to a separate pen."

The detector car illustrated in the copending application has just been returned to the shop after use of several months by a large railroad. The car was equipped with the single pickup coil illustrated in Figs. 12 and 13 of the copending application and not with the multiple coil suggested in Fig. 3 thereof. The operators of the car during this period felt that the single pickup coil was not sufficiently discriminative to permit rapid rail testing. They reached by experience the conclusion that applicants thought likely at the time that the copending application was drawn.

These several months of experience with the detector car shown in the copending application has resulted in cost figures per mile for testing rail by that apparatus. The figures are high because the testing is slow, and in no small part this slowness is attributable to stopping the testing car to check shells and flows. When a signal appears on the tape, the operators must stop unless they see a burn, a shell or a flow. Usually a helper is walking ahead of the car. If the helper is walking on the gauge side of the rail, he cannot see the field side clearly and if he is walking on the field side of the rail, he cannot see the gauge side. If he overlooks either a flow or a shell, and applicants' single coil causes the pen to write, the car must be stopped and the helper goes back to examine the rail. Rails are not removed because of shells, flows or burns and consequently rails that are in the track for many years accumulate shells and flows. It follows that most signals produced by flaw detection apparatus today come from shells, flows, and burns which are harmless defects in the rail. Moreover, the main line track of the principal railroads of the country are being tested for fissures every two or three months with the result that on a given test, a fissure may be encountered only once every twenty-five miles, while burns, flows and shells may number a hundred or more to the mile and in approaches to yards they may greatly exceed this number. It is seen, therefore, that the shells, flows, and burns are primarily responsible for slowing down the rate of rail testing. The burns are not serious because they can be seen by the car operator.

A feature of this invention is a multiple coil consisting of three small coils positioned in staggered relationship across the top of the rail ball, so that one called the field coil will check the field side of the rail, one called the gauge coil will check just the gauge side of the rail, and one called the center coil will check the center part of the rail. A shell will induce a potential signal only in the gauge coil and a flow will produce a potential signal only in the field coil. The center coil usually is unaffected by either shells or flows. Moreover, most burn spots on a rail are along the longitudinal median line of the ball so that all but very big burns will produce a potential signal in the center coil and not in either the gauge coil or the field coil. An internal fissure having its faces polarized has some portion of itself under the center coil so that it produces a signal in at least two of the coils. Experience has demonstrated that if the fissure is of any size, it usually produces a signal in all three coils. The effectiveness of this system is dependent upon the smallness of the applicants' coil as measured longitudinally of the rail, for this makes it possible to mount the coils closely together so that when a fissure produces a potential signal in more than one coil, the pens writing the visual signal will appear to act simultaneously. The detector car will be stopped only when the center pen makes a mark and no burn shows on the track.

A second object of this invention is to improve the visual signal derived from a fissure inside the joint bars and close to the rail ends. One of the advantages of applicants' system resides in the fact that a small coil having a nonmagnetic core is not affected by the ends of the joint bars, which are about eighteen inches inside the end of the rail. As applicants' nonmagnetic core coil moves over the joint bar end, no signal is transmitted to the amplifier. This should make it possible to detect fissures right up to the end of the rail. However, the heavy flux field between the two rail ends at the joint is sufficiently strong about two or three inches from each rail end to start producing a strong potential signal. On a tape which is recording 39 feet of rail on a 4-inch line, an operator can distinguish a fissure 4 to 6 inches from the end of the rail because the pen signal on the tape is discriminatory for about 1/64 of an inch, although this is not true for practical rail testing purposes. Multiplying 64 by 4 inches produces 256, which, divided into the 468 inches of a standard 39-foot rail, indicates that the pen is discriminatory for about each two inches of the movement of applicants' pickup along the rail. This discrimination stems primarily from the pickup coil which extends longitudinally of the rail for substantially less than an inch. However, the spacing between a pen signal derived from a fissure only a few inches from a joint is so close together that they may be confused with a signal from the joint followed by unusual mechanical vibration of the pen. If there were some way of clearly and decisively detecting the signal from the fissure close to the joint, the tape system would be materially improved.

It is an old practice to provide a rail joint pen which writes side-by-side with a pen responsive to a main pickup. The rail joint pen is actuated by its own pickup and its amplification system is biased to withstand a much stronger signal. It occurred to applicants that if they functioned a rail joint pen from the amplifier deriving signals from a principal pickup, but with a greater bias against the conductivity of the last stage handling the rail joint signal only, they would have two pens actuated from a common source, but only one pen would write both signals. More specifically, where the two pens are writing side by side and both are actuated by a common flux-responsive means but one pen will be actuated solely by a rail joint, where the flux-responsive means passes over a rail joint only, the two marks will be identical. However, if the flux-responsive means passes over a fissure three inches or more from the end of the rail, the regular pen will write an additional signal or aberration and comparison of its mark with the adjoining joint pen mark will quickly show this aberration. Those portions of the rail inside the ends of the joint bars are the principal concern of the railroads at the present time for existing equipment has done an effective job in maintaining the main body of the rail clear of fissures.

Other objects of the invention include improvements in the design of the core block which provide a very rugged structure which can be dropped without damaging the delicate coils. It should be mentioned that the coil disclosed in this application is thinner than the coil shown in the copending application and hence, having the same number of turns and the same weight of wire, it extends slightly farther out from the core around which the coil is wound.

These and such objects as may hereinafter appear are attained in one embodiment of the drawings wherein:

Figs. 1, 2, and 3 are Figs. 3, 12, and 13 respectively of the copending application, but with new numbers; Fig. 1 being a schematic plan arrangement of applicants' three pickup coils connected to independent amplifiers and pen units; Fig. 2 being a plan view of one of applicants' pickup coils; and Fig. 3 being a cross sectional view of one of said coils;

Fig. 4 is a leading or trailing coil core shown in perspective and unwired;

Fig. 5 is a center coil core shown in perspective and unwired;

Fig. 7 is a front elevation of the pickup block taken in line 7—7 of Fig. 6;

Fig. 8 is a side view in elevation of the suspended carriage which holds the multiple coil; and, Fig. 9 is a front elevation of the device shown in Fig. 8.

Figure 6:
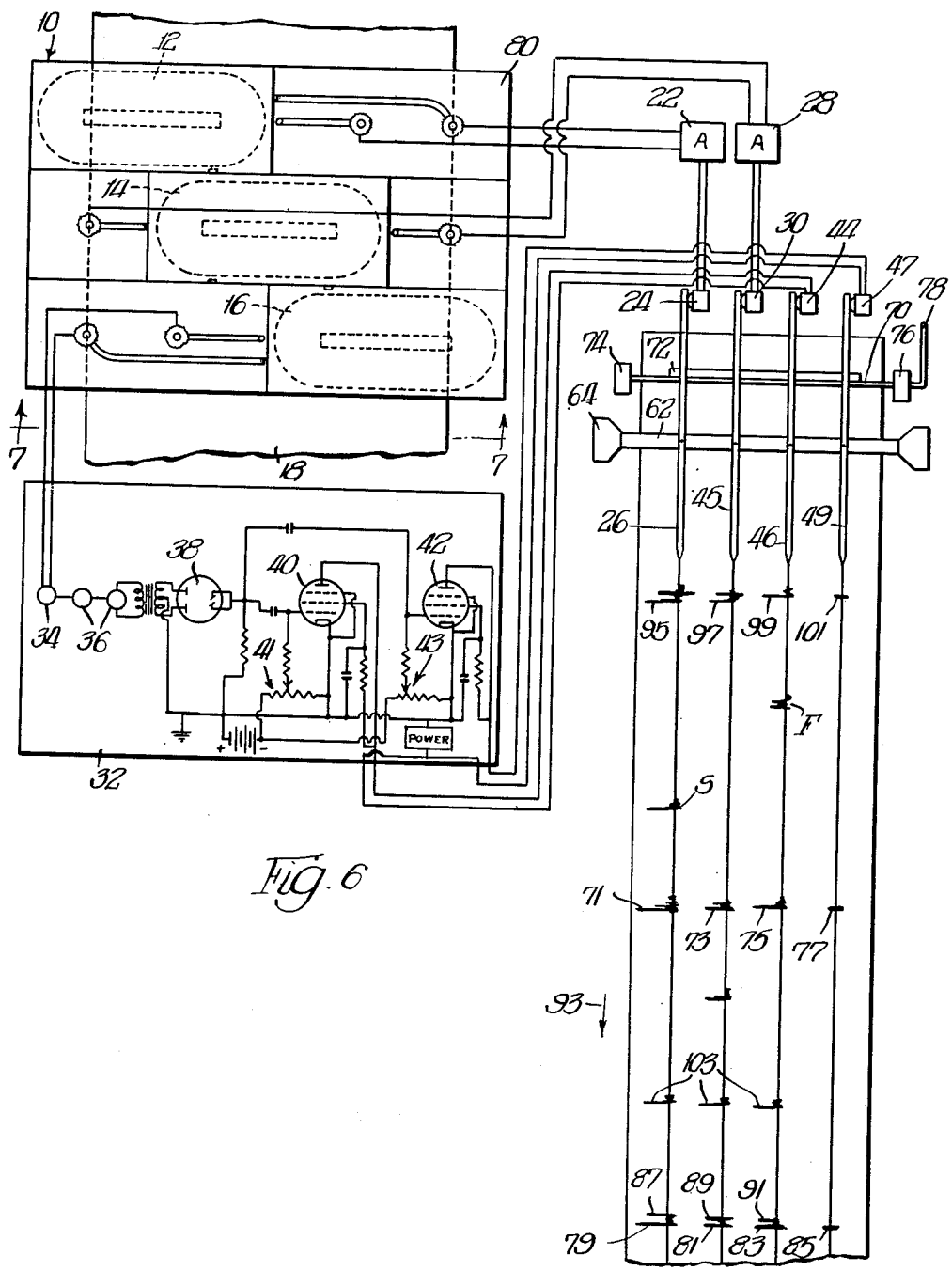
Fig. 6 is a plan view of a three-coil pickup and a schematic view showing that pickup connected through separate amplifiers and functioning four pens.

The drawings do not disclose a rail car. Suffice it to say, applicants' pickup coil is suspended from a car having flanged wheels for use on a railroad track. The car carries necessary generating equipment for functioning various types of power units such as a generator 11 schematically shown in Fig. 1 including a traction motor, magnets such as 13, Fig. 1, tape motor, amplifiers, paint guns, audible signals, and other equipment used on flaw detector cars.

Referring to the drawings, and particularly to Fig. 6, applicants' multiple coil unit is identified by the numeral 10 and consists of three coils 12, 14, and 16 in staggered relationship above the rail 18. For convenience, 12 will be identified as the gauge coil, 14 as the center coil, and 16 as the field coil. Each coil consists, referring to Fig. 7, of an upper winding 19, and a lower winding 20, reversely wound with respect to winding 19, so that the two coils will buck out certain types of potential producing fields such as those generated by electric generators or motors on the flaw detector car, all as shown in the Frickey and McKee Patent No. 2,388,683. When the word "coil"—in the singular—is used herein, only the lower coil of a pair is meant. In Fig. 7, it is coil 20, which is the coil next to the rail. Returning to Fig. 6, the gauge coil 12 is connected to the amplifier 22 which steps up the voltage of any potential signal received from the gauge coil 12 and functions coil 24 which actuates the gauge pen 26.

The center coil 14 is connected to an amplifier 28 which similarly actuates the center pen coil 30 and center pen 45.

The field coil 16 is connected to an amplifier 32 having stages 34 and 36 which amplify potential signals produced by the gauge coil, and having stage 38 which full wave rectifies the signals. The output of the full wave rectification stage is introduced into two separate amplification stages 40 and 42. The output of stage 40 actuates a field pen coil 44. This operates the field pen 46. The output of stage 42 actuates a joint pen coil 47 and joint pen 49. In stage 42, the tube is heavily biased against conductivity so that a signal will be received from the stage 42 only when a very strong signal is generated by the gauge coil 16. The strong signal is that which is received by a broken rail or the gap between the rails at a joint.

The only details in the amplifier that are illustrated in the drawings relate to stages 40 and 42, which employ identical pentode tubes. The wiring connections and the positions of the condensers and resistances are illustrated, 41 and 43 identifying potentiometers. The various voltages need not be shown because electronics engineers can obtain the result by the arrangement which is shown and undoubtedly by other arrangements. Suffice it to say, the bias against the tube conductivity in stage 40 which determines the minimum amplitude of a signal received from a full wave rectification stage 38 necessary to function the coil is low so that a signal of low potential received from the coil 16 will function the field pen coil 44; and the bias against the conductivity of the tube in stage 42 is high so that the amplitude of a signal from the pickup coil 16 must be great in order to function the joint pen coil 47.

Continuing to refer to Fig. 6, the ink trough 62 opens at either end into reservoirs 64 and 66. On applicants' equipment, the tape 68 runs parallel to the length of the equipment, that is parallel to the track, and the equipment is removed from the track by tilting it transversely. The ink in the trough runs into either one or the other of the reservoirs and thereby does not spill.

Continuing to refer to Fig. 6, 70 identifies a shaft carrying an offset bar 72 and rotatable in blocks 74 and 76 mounted on the table top. 78 is a lever arm. The shaft 70 is immediately beneath the pen arms. When it is desired to back the car, the arm 78 is thrown over 90 degrees and the offset bar raises the pens from the paper.

Referring to the tape in Fig. 6, numerals 71, 73, 75, and 77 identify the pen markings resulting from the three pickups, 12, 14, and 16, passing over a rail joint. Each mark has a peak and the four peaks are substantially in transverse alignment, although peak 71 was written slightly earlier than 73 and 73 earlier than 75 and 77. For all practical purposes, this time sequence cannot be noticed on the tape because the operator hasn't the time to study it closely and the pen is not a sufficiently sensitive instrument to demark changes in movement along a rail of only one inch. However, if the car is running fairly slowly, an operator can hear the successive actuations of the coils 24, 30, and 44. At any event these represent a normal joint signal.

Peaks 79, 81, 83, and 85 also were derived from a rail joint, this being a sound assumption because they are all in substantially transverse alignment and peak 85 only appears when the pickup passes through the field created by a break in a rail, such as a joint. The gauge, center, and field pens each wrote a second peak, namely 87, 89, and 91. This second peak is within three or four inches of the end of the rail and it must indicate an internal deflect such as a fissure. A hand check will be performed at this point. The significance of the signal written by the field pen is arresting to an operator who knows that that signal came from the same pickup coil as produced the joint pen signal 85. He realizes that the bias on the joint pen stage 42 cut off the lower potential signal which caused the signal 91 by the field pen. In Fig. 6, the tape is moving in the direction of the arrow 93 and it follows that the fissure is in the leading end of the rail onto which the flaw detector car has just advanced.

The signals indicated by the numerals 95, 97, 99, and 101 convey the same meaning as those found at the bottom part of the tape excepting that in this case the signals from the fissure were received before the joint was reached and the operator knows that they are in the rail that the detector car is leaving.

The letter S on the tape identifies a shell, and the letter F identifies a flow. Inasmuch as only one pen is actuated, the operators do not stop the car. They proceed. The same is true of the burn marked B and registered by the center pen. The numeral 103 identifies the almost identical markings of the three pens in passing a 40 per cent internal transverse fissure. The fissure was fairly well centered.

The coil unit 10 consists of three blocks, two identical, and a center block. These blocks are made of layers of canvas impregnated with Bakelite. Considering block 80, illustrated in Fig. 4, applicants shave down the block so as to form wire channels 82 and 84 which have the block as one side, a thin flashing such as 86 and 88 as the other side, and a connecting core 90 as the bottom of the channels. A groove 92 on the side surface of the block 80 connects the channels 82 and 84. A hole 94 penetrates the block immediately adjacent to the edge 96 of the flashing 86. A pair of straight, knurled plug sockets 98 and 100 are pressed into cylindrical holes in the block 80. A jack coupling such as 102 carrying a conductor such as 104 may be plugged into this type of socket. A groove 106 connects the socket 98 to the drilled passageway 94 and a groove 108 from the socket 100 extends to a point adjacent the edge 96 of the flashing 86.

In winding an end coil, the lower winding which will run several hundred turns is first completed. A short end of this winding is run up through the passageway 94 and the groove 106 and soldered or otherwise fastened to the socket 98. The other end is run along the groove 92 and the upper winding is completed. The free end of the upper winding is then carried by the groove 108 and fastened to the socket 100. Thereupon the coils are saturated with a liquid which will harden and which will protect the enamel on the wire which insulates the wires from each other. The insulation is, of course, of crucial importance. Thereafter, the channels 82 and 84 and the grooves 92 and 106 and 108 are filled with plastic wood. This plastic wood has a lacquer base which would destroy the enamel on the wire but for the protective coating. The plastic wood hardens very well and protects the coil from physical damage and it adheres tightly to the flashings so that they do not break off.

The coil block shown in Fig. 5 is substantially identical with that described and shown in Fig. 4 excepting that the flashings 108 and 110 are centered in the block and the jack sockets 112 and 114 are positioned one on each side of the coil. In assembling three blocks together, the side wall grooves such as 92 are always positioned inwardly as illustrated in Fig. 6. The blocks are joined together by an adhesive.

The pickup suspension is illustrated in Figs. 8 and 9. The pickup holder consists of a base plate 116 upon the upper surface of which in lateral alignment are mounted a pair of guide dowels 118 and 120 and a threaded post 122. Mounted beneath the car is, not shown, a plate having holes to receive the dowels and a threaded member which can be turned so as to raise or lower the plate 116 with respect to the rail. Returning to Fig. 8, a pair of plates 124 and 126 are fastened to the base plate 116 by hinges 128 and 130. On the outside of each of the plates 124 and 126 is fastened a spring such as 132 and 134. Central portions 136 and 138 of springs 132 and 134 respectively slideably engage the top of the plate 116 and being of the same strength, they exert equal pressures inwardly on the plates 124 and 126 so as to hold them in vertical position. The plates 124 and 126 hold by hinges 140 and 142 an inverted U-shaped member called the pickup holder 144. The U-shaped member has on each arm upwardly directed toes 146 and 148 for keeping the pickup coil from damaging itself from a dropoff in a joint. The multiple coil pickup 10 is held between the arms of the member 144 and screws such as 150. The plates 124 and 126 carry slots such as 152 and an eye 153 is mounted on the U-shaped member 144 in transverse alignment with the slot. When it is desired to raise the pickup coil above the rail, the U-shaped member is swung to the right or the left so that the eye passes through the slot and a pin is placed through the eye and thereby holds the pickup coil in raised position.

In Fig. 1, which is identical with Fig. 3 of the copending application, 155 identifies a rail ball over which are positioned two small coils 154 and 156 preceded by a full-width coil 158. These coils are connected each to its own amplifier such as 160, 162, and 164, which function a full ball pen 166, a field pen 168, and a gauge pen 170. The theory of this arrangement of coils is that unless all three pens register a signal, a stop will not be made. On the tape 172, a stop will be made for 174 but a stop will not be made for 176. This system is not as effective as the preferred form disclosed in Fig. 6.

Figs. 2 and 3 are included in this disclosure because they are the parent type of nonmagnetic core which was developed into the core blocks illustrated in Figs. 4, 5, 6, and 7. Channel 178 is a little wider than the channels in the preferred blocks and inasmuch as the weight of the wire in the new coils is identical with that used in the older coils, the winding fills the slot up a little more. This is illustrated in Fig. 3.

Having thus described our invention, what we claim as new and patentable is:

1. Apparatus for detecting defects in rails lying in track comprising a car, means for electrically energizing the rail ball suspended from the car, a flux-responsive coil wound on a nonmagnetic core extending lengthwise of the rail ball for less than the length of a typical transverse fissure flux field suspended from said car adjacent a rail and connected to an amplifier, two aligned visual presentation means responsive to amplified potential signals generated by this single flux-responsive coil, and means for limiting one visual presentation means to depicting signals that attain a selected high amplitude.

2. Apparatus for detecting defects in rails lying in track comprising a car, means for electrically energizing the rail ball suspended from the car, a flux-responsive coil wound on a nonmagnetic core extending lengthwise of the rail ball for less than the length of a typical transverse fissure flux field suspended from said car adjacent a rail and connected to an amplifier, a rail pen and a joint pen responsive to amplified potential signals generated by this flux-responsive coil transversely aligned over a moving tape, and means in the amplifier for actuating both pens in response to a selected high amplitude signal and for actuating the rail pen only for low amplitude signals.

3. Apparatus for detecting defects in rails lying in track comprising a car, means for electrically energizing the rail ball suspended from the car, a flux-responsive coil wound on a nonmagnetic core extending lengthwise of the rail ball for less than the length of a typical transverse fissure flux field suspended from said car adjacent a rail and connected to an amplifier, and a pair of output stages in the amplifier parallel to each other and each connected to a pen unit, said pen units being transversely aligned over a moving tape, one of said stages being adjusted to transmit to its associated pen unit only potential signals of a selected high amplitude and the other stage being adjusted to deliver all potential signals above a selected low amplitude.

4. Apparatus for detecting defects in rails lying in track comprising a car, means for electrically energizing the rail ball suspended from the car, a flux-responsive coil wound on a nonmagnetic core extending lengthwise of the rail ball for less than the length of a typical transverse fissure flux field suspended from said car adjacent a rail, a single channel amplifier having a first stage and a final single channel stage, a conductor connecting the flux-responsive coil to the first stage, two stages connected in parallel with each other to the final single channel stage, one stage called the rail pen stage having a low bias so as to forward signals of low potential amplitude and the other stage called the rail joint stage having a high bias so as to forward only signals of high potential amplitude, and visual presentation means connected to each of said parallel stages and mounted in transverse alignment over a moving tape.

5. The apparatus in claim 4 wherein the final single channel stage is a full rectification stage.

6. Apparatus for detecting defects in rails lying in track comprising a car, a flux-responsive coil having a width substantially less than the width of a rail ball suspended from said car adjacent the rail ball and connected to an amplifier, said coil being wound on a nonmagnetic core and extending lengthwise of the rail ball for less than the length of a typical transverse fissure flux field, two visual presentation means responsive to amplified potential signals generated by this single flux-responsive device, and means for limiting one visual presentation means to depicting signals that attain a selected high amplitude.

7. Apparatus for detecting defects in rails lying in track comprising a car, a plurality of flux-responsive coils having a non-magnetic core and a width less than the width of a rail ball suspended from the car in side-by-side relationship and staggered with respect to each other longitudinally of the rail ball, a like plurality of amplifiers, conductors connecting each flux-responsive coil to an associated amplifier, and a visual presentation means connected to each amplifier.

8. The apparatus of claim 7 wherein one flux-responsive coil is centered on the rail ball, one is across the gauge edge, and another is across the field edge.

CHESTER W. McKEE.
RICHARD W. McKEE.

REFERENCES CITED

The following references are of record in the file of this patent:

UNITED STATES PATENTS

| Number | Name | Date |
| --- | --- | --- |
| 1,663,831 | Falck | Mar. 27, 1928 |
| 1,893,262 | Apple | Jan. 3, 1933 |
| 1,935,404 | Leopold | Nov. 14, 1933 |
| 2,109,455 | Barnes et al. | Mar. 1, 1938 |
| 2,113,785 | Drake et al. | Apr. 12, 1938 |
| 2,218,673 | Drake | Oct. 22, 1940 |
| 2,297,879 | Drake | Oct. 6, 1942 |
| 2,388,683 | Frickey et al. | Nov. 13, 1945 |